United States Patent Office 3,272,884
Patented Sept. 13, 1966

3,272,884
METHOD FOR THE RECOVERY OF ANTHRACENE
Norman S. Boodman, Monroeville, Philip X. Masciantonio, Penn Township, Westmoreland County, and George W. Perkins, Delmont, Pa., assignors to United States Steel Corporation, a corporation of Delaware
No Drawing. Filed June 7, 1965, Ser. No. 462,078
12 Claims. (Cl. 260—675)

This invention relates to a process for the recovery by crystallization of purified anthracene from coal-tar fractions, more particularly from middle creosote fractions.

Coal tar as produced in the carbonization of coal contains many useful compounds. Usually, only the lower-boiling compounds have been individually recovered on a commercial scale by distillation techniques. Most compounds boiling above 270° C. are present in such low concentration or are so contaminated by co-distilling impurities as to preclude economical recovery in commercially feasible distillation columns. In the latter category are anthracene (B.P. 342° C.) with co-distilling phenanthrene (B.P. 340° C.) and carbazole (B.P. 352° C.).

For the above reasons, anthracene recovery is usually effected by a combination of distillation and crystallization. In a known commercial process for anthracene recovery a creosote-oil fraction is separated. This fraction may distill in a range between about 230° and 400° C. or in some narrower boiling range. The high-melting solids, undesirable in commercial creosote, are salted out by allowing hot creosote to cool in huge tanks. The resulting salt cake or anthracene cake comprises largely anthracene, phenanthrene and carbazole. Various solvents have been used to obtain purified anthracene and carbazole by crystallization techniques.

It is an object of our invention to provide a recrystallization process utilizing relatively small quantities of light and middle creosote as a source of crude anthracene cake and as crystallization solvent.

It is a more specific object of our invention to provide a recrystallization process utilizing a well defined creosote blend to obtain a crude anthracene cake and to recrystallize this cake using heavy tar-base fractions as solvents.

In a preferred embodiment, our invention comprises a three-step crystallization process for the recovery of 95% anthracene. In the first step, a crude anthracene cake is crystallized from a blended creosote comprising light and middle creosote fractions. The resulting anthracene cake is then twice recrystallized from a heavy tar-base fraction boiling in a range between about 230° and 270° C. The proportions by weight of the mixtures and crystallization temperatures are closely controlled for optimum results.

In the distillation of coal tar, a middle creosote fraction has a nominal boiling range between about 315° and 355° C. More particularly, a fraction having a nominal boiling range between about 320° and 330° C. comprises largely anthracene, phenanthrene and carbazole. A 315° to 355° C. fraction would contain about 10–14% anthracene and a 320° to 330° C. fraction about 15–18% anthracene. While our process will operate with a fraction containing about 10% anthracene, we prefer higher concentrations to reduce the total quantity of components to be handled.

In the distillation of coal tar, a light creosote fraction may have a nominal boiling range between about 265° and 320° C. In our process this fraction comprising about 20% thereof boiling in a range below about 280° C. serves as a solvent to produce a crude anthracene cake from a middle creosote fraction. A commercial fraction boiling in a range between about 265° and 300° C. would comprise between about 30 and 35% thereof boiling below about 280° C. It is preferred that in a light creosote fraction between about 20% and 50% by weight thereof should boil in a range below about 280° C.

In the initial purification step, preferably a blend of about 1.2 parts by weight of said light creosote fraction and one part by weight of said middle creosote fraction is heated with stirring to about 100° C. to dissolve all crystals. Thereafter, the mixture temperature is reduced to about 55° C. and the crystals are separated at this temperature from mother liquor by known means, for example, by counter-current crystallization, by filtration or by centrifuging. The anthracene cake contains between about 25% and 35% by weight anthracene, with a recovery between about 65% and 70% of the total anthracene available. The preferred operating range for the blend may be between about 0.75 and 1.5 parts light creosote to one part middle creosote. Within this range, improved crystallization must be balanced against handling an increasing volume of components. Any elevated temperature that will completely dissolve all crystals in the blend is satisfactory. The preferred operating range for the crystallization temperature is between about 30° and 65° C. The anthracene content of the cake is generally proportional to the crystallization temperature employed. The cake yield and recovery of available anthracene is generally inversely proportional to the temperature employed. A commercial crystallization is preferably conducted at about 55° C. to obtain a cake containing about 35% anthracene with a recovery of about 70% of the available anthracene. Generally, as the ratio of light to middle creosote is increased, the anthracene content of the cake increases but cake yield and anthracene recovery decreases. A commercial crystallization would blend light creosote in a range between 1 and 1.5 to 1 of middle creosote.

In the fractional distillation of coal tar, a fraction may be recovered boiling in a range between about 230° and 270° C. Upon acid washing of the fraction a methylnaphthalenes fraction may be separated by gravity from a heavy tar-base fraction. The latter, after springing with alkali, is used as a feed stock for the recovery of quinoline by fractional distillation. This quinoline heart cut distilling between about 237° and 239° C. comprises about 90% quinoline and 10% isoquinoline. We have found the feed stock, the quinoline fraction and more particularly the remaining forerunnings and residue fractions to be excellent solvents for the recrystallization of anthracene from crude anthracene cake. The latter fractions, substantially free of quinoline, comprise methylquinolines, isoquinoline, methylisoquinolines and some amphoteric indole and methylindoles.

As will be described hereinafter, the second crystallization, namely, the recrystallization of a crude anthracene cake employs recycled heavy tar-base fraction as solvent. In the subsequent third crystallization step, fresh heavy tar-base fraction is used, the mother liquor or drain oil therefrom being recycled to the second crystallization step. The mother liquor from the second crystallization step is usually added to the quinoline-recovery feed stock.

In the second crystallization step, preferably 1 part by weight of crude anthracene cake is dissolved by heating to about 100° C. with stirring in admixture with about 1.5 parts by weight of said recycled heavy tar-base fraction. Thereafter, the mixture temperature is reduced to about 45° C. and the crystals are separated at this temperature from the mother liquor. The anthracene crystals contain between about 50% and 70% by weight anthracene, with an approximately quantitative recovery of the anthracene available in the crude cake. The preferred operating range for the admixture may be between about 1.3 and 2.0 parts tar-base fraction to 1 part anthracene cake.

In the third crystallization step, preferably 1 part by weight of anthracene crystals is dissolved by heating to about 100° C. with stirring in an admixture with about 3 parts by weight of fresh tar-base fraction. Thereafter, the mixture temperature is reduced to about 45° C. and the crystals are separated at this temperature from the mother liquor. The preferred operating range for the admixture may be between about 2.5 and 6.0 parts tar-base fraction to 1 part anthracene crystals. It should be pointed out that this ratio, based on a smaller weight of anthracene crystals, simply furnishes the above-defined ratio of mother liquor recycled to the second crystallization step. Where the preferred recycling is not practiced, the tar base to anthracene ratio may be between about 3 and 6 parts to 1 part anthracene crystals.

As described for the first crystallization step, in the second and third steps, within the defined solvent-to-anthracene ranges, any improved crystallization with more solvent must be balanced against handling increased volumes of components. Any elevated temperature that will completely dissolve all crystals is satisfactory in the second and third steps. The preferred operating range for the crystallization temperature in the second and third steps is between about 25° and 55° C. The above comments relative to choice of temperature within a defined range, made with respect to the first crystallization step, are equally applicable to the second and third steps.

The anthracene crystals from the third step are contaminated with occluded tar-base fraction that may be removed by known means, for example, by vacuum drying or by water washing followed by vacuum drying. Crystals containing between about 92% and 95% anthracene were obtained by drying in a vacuum oven operated at a temperature of 110° C. and a pressure of 50 mm. Hg absolute. The tar-base fraction vapors from the oven may be condensed and reused, for example, by addition thereof to a storage tank for fresh tar-base fraction. Anthracene recovery at this point is between about 60% and 80% of the anthracene available in the crude cake, or a total recovery of between about 40% and 60% of the anthracene available in the original creosote blend.

The following are typical examples of our process:

EXAMPLES 1–7

A sample of 50 grams of a light creosote fraction had a boiling range between 270° and 320° C. About 20% by weight thereof had a boiling range below 280° C. The sample contained about 2.5% by weight anthracene. A sample of 100 grams of a middle creosote fraction had a boiling range between 320° and 330° C. The sample contained about 14.5% by weight anthracene. The two samples were mixed in a flask provided with a stirrer and heated to about 110° C. to dissolve all crystals. The contents of the flask were cooled to about 30° C., then poured into a rotating centrifuge, preheated to about 30° C. and centrifuged at about 4,000 r.p.m. for 15 minutes. About 63 grams crude anthracene cake were recovered as a cake yield of 42% of the creosotes' weight. The cake contained about 23% anthracene. This represented an anthracene recovery of about 90% of the weight of anthracene in the blend of light and middle creosotes. This procedure of Example 1 was repeated as Examples 2–7, with the same creosotes, to illustrate the effects of other combinations of these creosotes and other crystallization temperatures. The creosote blends and crystallization temperatures used and results obtained in Examples 1–7 are summarized in Table I.

*Table I*

| Example | Grams Light Creosote | Grams Middle Creosote | Crystallization Temp. (° C.) | Cake Yield, Percent of Creosotes' Weight | Anthracene Content, Percent by Weight of Cake | Anthracene Recovery, Percent of Weight in Creosotes |
|---|---|---|---|---|---|---|
| 1 | 50 | 100 | 30 | 42 | 23 | 92 |
| 2 | 100 | 100 | 30 | 27 | 27 | 85 |
| 3 | 150 | 100 | 30 | 20 | 26 | 71 |
| 4 | 50 | 100 | 55 | 28 | 26 | 70 |
| 5 | 100 | 100 | 55 | 17 | 36 | 71 |
| 6 | 150 | 100 | 55 | 11 | 44 | 66 |
| 7 | 50 | 100 | 65 | 27 | 30 | 76 |

The above examples indicate that purity and recovery of anthracene are inversely related. Comparing Examples 1, 4, and 7, the anthracene content, or purity, of the crude cake increases with increased crystallization temperature. Anthracene recovery and cake yield, however, decrease with increased crystallization temperature. From a comparison of Examples 1, 2 and 3 or 4, 5 and 6, it is evident that, generally, as the ratio of light to middle creosote is increased, the anthracene content of the recovered cake increases but cake yield and anthracene recovery decrease. A preferred combination of temperature and creosote blend is about 55° C. and a ratio of about 1 to 1.5 parts of light creosote to 1 part of middle creosote, respectively, by weight.

EXAMPLES 8–10

The procedure of Example 1 was repeated as Examples 8–10 to illustrate the effect of anthracene content of creosote blends on the recovery and purity of a crude cake. In Examples 8–10, the crystallization temperature was 55° C. and the weight ratio of light to middle creosote was 1:1. The middle creosote had a distillation range between 315° and 355° C. in Example 8; between 320° and 340° C. in Example 9 and between 320° and 330° C. in Example 10. The light creosotes were typical fractions containing between about 1.9% and 2.5% anthracene. The anthracene contents of the middle and light creosotes and the results obtained in Examples 8–10 are summarized in Table II.

*Table II*

| Example | Anthracene Content, Weight Percent | | Cake Yield, Percent of Creosotes' Weight | Anthracene Content, Percent by Weight of Cake | Anthracene Recovery. Percent of Weight in Creosotes |
|---|---|---|---|---|---|
| | Middle Creosote | Light Creosote | | | |
| 8 | 10.7 | 2.2 | 10 | 35 | 54 |
| 9 | 14.5 | 2.5 | 17 | 36 | 71 |
| 10 | 15.7 | 1.9 | 22 | 33 | 79 |

From the above examples, it is evident that it is preferred to use a middle creosote having a high anthracene content, usually at least about 14–15%. However, a middle creosote with a 10.7% content yielded an acceptable cake.

EXAMPLES 11–13

In Example 11, 1,000 grams crude anthracene cake containing about 354 grams anthracene were mixed in a flask provided with a stirrer with 1,500 grams of a tar-base fraction, distilling in a range between about 230° and 270° C., from which a quinoline heart cut had been removed by fractionation. The mixture was heated to a temperature between 105° and 115° C. to ensure complete solution of all crystals. The solution was stirred and cooled to about 45° C., then transferred to the basket of a centrifuge turning at about 4,000 r.p.m. and previously heated to about 45° C. After 15 minutes of centrifuging, the anthracene crystals were mixed with 1,500 grams of a fresh portion of the same tar-base fraction. The above-described heating, cooling and centrifuging were repeated. Thereafter, the anthracene crystals were dried in a vacuum oven for about 9 hours at a temperature of 95° C. and a pressure of 10 mm. mercury absolute (mm. Hg abs.) to free the crystals of residual tar-base fractions. This procedure of Example 11 was repeated as Examples 12 and 13 with similar crude anthracene cake to illustrate the effect of recycling a second crystallization mother liquor from Example 11, as solvent in the first crystallization in Example 12 and using the second crystallization mother liquor from Example 12, as solvent in the first crystallization in Example 13. The products were analyzed for anthracene content by an infrared spectrometric method. The results obtained in Examples 11–13 are summarized in Table III.

however, the anthracene recovery is enhanced very appreciably.

EXAMPLES 14–17

To illustrate the effect of different crystallization temperatures, the procedures of Example 11 and recycling Example 12 were repeated as Examples 14 and 15, respectively, using a similar anthracene cake. The crystallizations and centrifugations in Examples 14 and 15 were conducted at 28° C. The procedures of Examples 14 and 15 were repeated as Examples 16 and 17, respectively, except that the crystallizations and centrifugations were conducted at 45° C. The results of Examples 14–17 are summarized in Table IV.

*Table IV*

| Example | Solvent-To-Cake Weight Ratios | | Overall Anthracene Crystal Yield, percent of Crude Cake Weight | Anthracene Content of Final Product, Weight percent | Anthracene Recovery, percent of Weight in Crude Cake |
|---|---|---|---|---|---|
| | First Crystallization | Second Crystallization | | | |
| 14 | 1.5:1 | 3.1:1 | 29.1 | 97.4 | 80 |
| 15 | 1.6:1 | 2.8:1 | 31.6 | 93.4 | 83 |
| 16 | 1.5:1 | 3.8:1 | 23.2 | 92.7 | 61 |
| 17 | 1.6:1 | 3.2:1 | 30.0 | 95.3 | 81 |

From the above examples, it is evident that products of acceptable purity and good anthracene recovery are obtainable when the respective crystallizations are effected at 28° C. and 45° C. There appears no advantage to cooling the crystallizing slurry and making a separation much below a temperature of 45° C.

EXAMPLES 18–20

To illustrate the effect of different tar-base fractions as solvents, the procedure of Example 11 was repeated as Examples 18–20. In Example 18, the anthracene cake was somewhat leaner in anthracene than in Example 11, containing about 320 grams anthracene in a 1,000 gram portion. The tar-base fraction was a complete fraction, distilling in a range between about 230° and 270° C. In Example 18, the solvent-removal step was different from that used in Example 11 and comprised a water washing of the crystals, followed by drying for 3 hours at 65° C. and at a pressure of 125 mm. Hg absolute. In Example 19, the anthracene cake contained about 320 grams anthracene in a 1,000 gram portion. The solvent in Ex-

*Table III*

| Example | Solvent-To-Cake Weight Ratios | | Overall Anthracene Crystal Yield, percent of Crude Cake Weight | Anthracene Content of Final Product, Weight percent | Anthracene Recovery, percent of Weight in Crude Cake |
|---|---|---|---|---|---|
| | First Crystallization | Second Crystallization | | | |
| 11 | 1.5:1 | 3.8:1 | 23.2 | 92.7 | 61 |
| 12 | 1.6:1 | 3.2:1 | 30.0 | 95.3 | 81 |
| 13 | 1.6:1 | 3.2:1 | 27.3 | 94.0 | 73 |

From the above Example 11, it is evident that in our process fresh tar-base fraction may be used as crystallization solvent in each of the two crystallizations. From Examples 12 and 13, it is evident that recycling solvent separated from a second crystallization step for use in a subsequent first crystallization step is more economical in solvent use and in the volume of solvent returned to a solvent-recovery or regeneration step. More importantly, ample 19 represented a quinoline heart cut removed by fractionation from the broad-range, tar-base fraction used in Example 18. In Example 20, the anthracene cake contained about 354 grams anthracene in a 1,000 gram portion. The solvent in Example 20 represented the combined forerunnings and tails fractions remaining after the quinoline heart cut of Example 19 had been removed from the broad-range, tar-base fraction of Example 18.

In Examples 18–20, the solvent-to-cake ratios were greater than in Example 11. These ratios and the results obtained in Examples 18–20 are summarized in Table V.

*Table V*

| Example | Solvent-To-Cake Weight Ratios | | Overall Anthracene Crystal Yield, percent of Crude Cake Weight | Anthracene Content of Final Product, Weight percent | Anthracene Recovery, percent of Weight in Crude Cake |
|---|---|---|---|---|---|
| | First Crystallization | Second Crystallization | | | |
| 18 | 2:1 | 5.6:1 | 22.0 | 93.6 | 64 |
| 19 | 2:1 | 5.7:1 | 21.9 | 97.9 | 67 |
| 20 | 2:1 | 5.6:1 | 22.5 | 94.9 | 60 |

The results obtained in the above examples make it evident that a wide-boiling-range, heavy tar-base fraction may be used as a solvent per se. The valuable quinoline heart cut fractionated therefrom is an excellent solvent. More importantly, the remaining forerunnings and residue fractions after removal of a quinoline heart cut represent a good solvent. Examples 16 and 20 are quite comparable in the crude anthracene cake purified, as well as in the solvent and crystallization temperature employed. In Example 16, the solvent-to-cake ratio was 1.5:1 in the first crystallization and 3.8:1 in the second crystallization, both with fresh solvent. The final product analyzed 92.7% anthracene by weight in a 61% recovery of the crude cake. In Example 20, the solvent-to-cake ratio was 2:1 in the first crystallization and 5.6:1 in the second crystallization, both with fresh solvent. The final product analyzed 94.9% anthracene by weight in a 60% recovery of the crude cake. While the higher solvent-to-cake ratios may be used, for economy of solvent utilization as well as product quality a blend ratio of 1.5:1 and 3.8:1 is preferred in the respective crystallization steps. Comparing Example 18 with Examples 19 and 20, it is evident that the drying time under vacuum may be reduced when the crystals are water-washed initially.

EXAMPLE 21

Eighty grams crude anthracene cake containing 28.6% anthracene were mixed in a flask provided with a stirrer with 160 grams of a complete tar-base fraction (1:2 weight ratio, respectively), distilling in a range between about 230° and 270° C. After dissolving the cake at 110° C., the mixture was cooled to 45° C., and centrifuged at this temperature at 4,000 r.p.m. for 15 minutes. The separated 26.9 grams anthracene crystals were mixed with 160 grams of a fresh portion of the same tar-base fraction (1:6 weight ratio, respectively). The above-described heating, cooling and centrifuging were repeated. Thereafter, the separated 22.2 grams anthracene crystals were dried in a vacuum oven for about 9 hours at a temperature of 95° C. and a pressure of 10 mm. Hg absolute. The 15.3 grams of dried anthracene crystals contained 92.4% anthracene by weight for a recovery of about 60 weight percent of the anthracene in the crude cake. The example illustrates that an anthracene cake relatively low in anthracene content, may be treated to recover anthracene of high purity.

EXAMPLE 22

A sample of 1,200 grams of a light creosote fraction had a boiling range between 270° and 320° C. About 20% by weight thereof had a boiling range below 280° C. The sample contained 30 grams anthracene. A sample of 1,000 grams of a middle creosote fraction had a boiling range between 320° and 330° C. The sample contained 145 grams anthracene. The two samples (in a 1.2:1 weight ratio, respectively) were mixed in a flask provided with a stirrer and heated to 110° C. to dissolve all crystals. The contents of the flask were cooled to 55° C., then poured into a rotating centrifuge preheated to 55° C. and centrifuged at about 4,000 r.p.m. for 15 minutes. About 330 grams crude anthracene cake were recovered. The cake yield was 15% of the creosotes' weight. The cake contained about 36% anthracene. About 1,870 grams mother liquor were sent to a creosote storage tank. The crude anthracene cake was mixed in a flask provided with a stirrer with 538 grams of a recycled, heavy tar-base fraction (1:1.6 weight ratio, respectively). After dissolving the cake at 105° C., the mixture was cooled to 45° C. and centrifuged at this temperature at 4,000 r.p.m. for 15 minutes. About 713 grams mother liquor were sent to a recovery still and the 155 grams anthracene crystals were heated to 105° C. in a flask with about 494 grams of fresh, heavy tar-base fraction from storage (1:3.2 weight ratio, respectively). The tar-base fraction from which a quinoline heart cut had been removed by fractionation distilled in a range between about 230° and 270° C. The solution was stirred and cooled to 45° C., then transferred to the basket of a centrifuge turning at about 4,000 r.p.m. and previously heated to about 45° C. After 15 minutes of centrifuging, the 538 grams of mother liquor were recycled to the first crystallization step with a tar-base fraction. The 111 grams of wet anthracene crystals were dried in a vacuum oven for about 9 hours at a temperature of 95° C. and a pressure of 10 mm. Hg absolute. About 19 grams tar-base fraction were removed, condensed and sent to the fresh tar-base storage tank. About 92 grams of dried anthracene crystals contained about 92% anthracene by weight, for a recovery of 71 weight percent of the anthracene in the crude cake and a recovery of 48 weight percent of the anthracene in the creosotes' blend.

While the above examples illustrate preferred methods of operation, changes therein may be made without departing from the spirit of the invention. It will be apparent that, for commercial operation, the hereinabove-described equipment may be of any design known to effect the desired results. While a defined middle creosote is a preferred source of crude anthracene cake, such a cake may be derived by other methods or from still bottom residues from naphthalene distillations or from salt derived from creosote tanks. These crude cakes, containing at least about 25% anthracene may be purified by the described double recrystallization, using the defined heavy tar-base fractions as solvent under the preferred concentration and temperature conditions. The boiling ranges of all fractions included in the specification and appended claims are nominal boiling ranges.

Although we have disclosed herein the preferred practice of our invention, we intend to cover as well any change or modification therein which may be made without departing from the spirit and scope of the invention.

We claim:

1. A process for the recovery of purified anthracene from a middle creosote fraction of coal tar containing anthracene and boiling in a range between about 315° and 355° C., said process comprising heating and dissolving said fraction in a light creosote fraction of coal tar boiling below about 315° C., at least about 20% by weight of said light creosote fraction boiling below about 280° C., cooling said mixture to at least about 65° C., separating anthracene cake and creosote fraction, heating and dissolving said anthracene cake in a recycled heavy tar-base fraction of coal tar, cooling said mixture to at least about 55° C., separating anthracene crystals and tar-base fraction, heating and dissolving said anthracene crystals in a fresh portion of heavy tar-base fraction of coal tar boiling in a range between about 230° and 270° C., cooling said mixture to at least about 55° C., separating purified anthracene crystals and tar-base fraction and recycling the latter to said first crystallization step with a heavy tar-base fraction.

2. A process as defined in claim 1 characterized by fractionating said heavy tar-base fraction and removing substantially all the quinoline therefrom and using the remainder of said fraction in said crystallization steps.

3. A process as defined in claim 1 characterized by fractionating said heavy tar-base fraction and removing substantially all the quinoline therefrom and using said removed quinoline in said crystallization steps.

4. A process as defined in claim 1 characterized by said light creosote fraction having a boiling range between about 265° and 320° C.

5. A process as defined in claim 1 characterized by said light creosote fraction having an initial boiling point of about 265° C., between about 20% and 50% by weight thereof boiling in a range below about 280° C.

6. A process as defined in claim 1 characterized by said first mixture comprising middle and light creosote fractions in a ratio range between about 1:0.75 and 1:1.5 parts by weight, respectively.

7. A process as defined in claim 1 characterized by mixing at least about 1.3 parts by weight of said recycled tar-base fraction per part by weight of said anthracene cake.

8. A process as defined in claim 1 characterized by mixing at least about 2.5 parts by weight of said fresh portion of tar-base fraction per part by weight of said anthracene crystals.

9. A process for the recovery of purified anthracene from a middle creosote fraction of coal tar containing anthracene and boiling in a range between about 320° and 330° C., said process comprising heating to about 110° C. 1 part of said fraction with about 1.2 parts of a light creosote fraction of coal tar boiling in a range between about 265° and 320° C., cooling said mixture to about 55° C., separating anthracene cake and creosote fraction, heating to about 100° C. and dissolving 1 part of said anthracene cake with about 1.5 parts of a recycled heavy tar-base fraction, cooling said mixture to about 45° C., separating anthracene crystals and tar-base fraction, heating to about 100° C. and dissolving 1 part of said anthracene crystals with about 3 parts of a fresh portion of heavy tar-base fraction of coal tar boiling in a range between about 230° and 270° C., cooling said mixture to about 45° C., separating purified anthracene crystals and tar-base fraction and recycling the latter to said first purification step with a heavy tar-base fraction, all parts being by weight and said tar-base fraction containing substantially no quinoline.

10. A process for the recovery of purified anthracene from a crude anthracene cake containing at least about 25% anthracene by weight comprising heating and dissolving said cake in a heavy tar-base fraction of coal tar boiling in a range between about 230° and 270° C., cooling the mixture to about 45° C., separating anthracene crystals and tar-base fraction, heating and dissolving said anthracene crystals in a fresh portion of said heavy tar-base fraction, cooling the mixture to about 45° C., separating purified anthracene crystals and tar-base fraction, all parts being by weight.

11. A process as defined in claim 10 characterized by fractionating said heavy tar-base fraction and removing substantially all the quinoline therefrom and using the remainder of said fraction in said crystallization steps.

12. A process as defined in claim 11 characterized by recycling the tar-base fraction separated from the crystals in said second crystallization step to said first crystallization step.

References Cited by the Examiner

UNITED STATES PATENTS 2,828,346    3/1958    Swaney _____ 260—675

DELBERT E. GANTZ, *Primary Examiner.*

G. E. SCHMITKONS, *Assistant Examiner.*